(12) United States Patent
Jung

(10) Patent No.: US 7,142,247 B2
(45) Date of Patent: Nov. 28, 2006

(54) DEINTERLACING APPARATUS AND METHOD THEREOF

(75) Inventor: You-young Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 555 days.

(21) Appl. No.: 10/626,883

(22) Filed: Jul. 25, 2003

(65) Prior Publication Data

US 2004/0207753 A1 Oct. 21, 2004

(30) Foreign Application Priority Data

Jul. 26, 2002 (KR) ............... 2002-44354

(51) Int. Cl.
*H04N 7/01* (2006.01)
(52) U.S. Cl. .................. 348/452; 348/448
(58) Field of Classification Search ........ 348/441, 348/448, 451, 452; *H04N 7/01, 11/20*
See application file for complete search history.

(56) References Cited

U.S. PATENT DOCUMENTS

| | | | |
|---|---|---|---|
| 5,027,201 A | 6/1991 | Bernard | |
| 5,159,451 A | 10/1992 | Faroudja et al. | |
| 5,671,018 A * | 9/1997 | Ohara et al. | 348/452 |
| 5,777,682 A | 7/1998 | De Haan et al. | |
| 5,943,099 A * | 8/1999 | Kim | 348/448 |
| 6,630,961 B1 * | 10/2003 | Shin et al. | 348/448 |

OTHER PUBLICATIONS

Office Action (issue date: Jul. 30, 2004) issued from Chinese Patent Office with respect to Chinese Patent Applicaiton No. 03143602.1 filed on Jul. 25, 2003.

* cited by examiner

*Primary Examiner*—Sherrie Hsia
(74) *Attorney, Agent, or Firm*—Staas & Halsey LLP

(57) ABSTRACT

An apparatus for and a method of deinterlacing an interlaced image signal. A weight value is calculated after detecting degree of a motion between a pixel of a previous field and a pixel of a next field relative to a pixel of the current field to be interpolated. An inter-field interpolation value is calculated based on pixels in previous and next fields corresponding to the pixel to be interpolated. An intra-field interpolation value is calculated based adjacent pixels in the same field as the pixel to be interpolated. A final interpolation value is calculated based on the on the inter-field interpolation value, the intra-field interpolation value and the weight value.

12 Claims, 7 Drawing Sheets

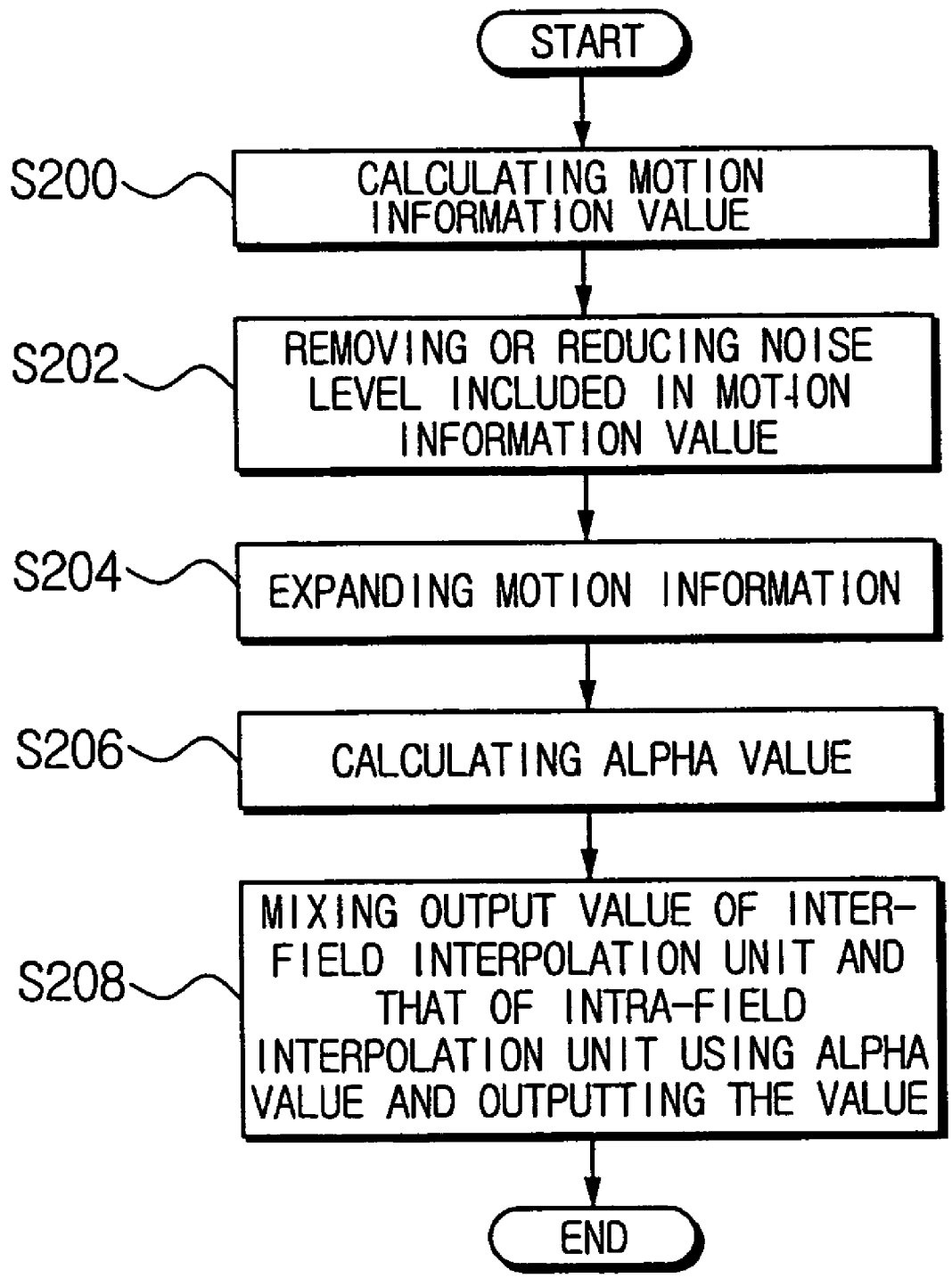

DEINTERLACING APPARATUS AND METHOD THEREOF

CROSS-REFERENCE TO RELATED APPLICATIONS

This application claims the benefit of Korean Application No. 2002-44354, filed Jul. 26, 2002, in the Korean Intellectual Property Office, the disclosure of which is incorporated herein by reference.

1. Field of the Invention

The present invention relates to an apparatus for and a method of deinterlacing, and more particularly, to an apparatus for and a method of deinterlacing which performs adaptive interpolation by estimating a degree of motion and referring to the estimated degree of motion to generate interpolated pixels.

2. Description of the Prior Art

Two ways of scanning for an image display apparatus include interlaced scanning and progressive scanning or non-interlaced scanning. The interlaced scanning is used for general TVs, and is a method where one image frame is divided into two fields and the fields are displayed on a screen in turn when one image is displayed. The two fields may be called a top field and a bottom field; an upper field and a lower field; or an odd field and an even field.

The progressive scanning or non-interlaced scanning is used for computer monitors or digital TVs, and is a method where an entire frame is displayed at one time by a unit of one image frame in a similar manner as a frame of a motion picture film is projected onto a screen.

A deinterlacing apparatus is a device to convert an image signal having interlaced scanning into an image signal having the non-interlaced scanning. For the image signal of the interlaced scanning to be normally processed in a display apparatus for processing the image signal having non-interlaced scanning, a deinterlacing apparatus for converting the image signal having the interlaced scanning to the image signal having non-interlaced scanning is necessary in the display apparatus.

Deinterlacing may be realized by several methods. As a basic method, a line repeating method that repeats the line information of a current field may be applied. The line repeating method is easily realized, but a resolution of an interpolated image is lower by one-half and some portions of an image may disappear.

To overcome the above shortcoming, two other methods have been developed. One method is an intra-field interpolation to realize a new field by inserting data that is the half of an original magnitude of the data of two lines into an area between two lines of a current field. The other is an inter-field interpolation that does not require motion compensation but builds one frame by inserting lines of previous and next fields of a current field into corresponding lines of the current field. These two methods may be realized with simple hardware, but have flaws when motion pictures are interpolated. Moreover, interpolated images may be deteriorated or the quality of the picture may be degraded.

To counter the above disadvantages, a motion-compensated interpolation method has been introduced. The motion-compensated interpolation method interpolates a screen of a current frame by dividing the screen into several blocks on the basis of data of a current field with regard to field data that is temporally consecutive, obtaining motion with respect to each of the blocks, and referring to the motion vector. The motion-compensated interpolation method is disclosed in the U.S. Pat. No. 5,777,682.

The motion-compensated interpolation method generally uses the motion vector of a unit of a block to estimate the motion, and a block artifact is sometimes generated on an interpolated image, as the unit of flaw correction is comprised of the block unit. Therefore, some complicated post-processing is required to prevent the block artifact, and accordingly, the structure of the hardware for performing the post-processing is quite complicated and a cost for the processing increases.

To solve the above problems of the motion-compensated interpolation, a motion-adaptation interpolation to interpolate frames in accordance with the motion by estimating the degree of the motion has been introduced. The motion-adaptation compensation method is disclosed in U.S. Pat. Nos. 5,027,201 and 5,159,451.

The motion-adaptation interpolation method has an advantage of being realized with simple hardware compared to the motion-compensation interpolation method and the quality of an interpolated picture is upgraded. However, the motion-adaptation interpolation may have noise of a stepping type as it operates interpolation of simple vertical direction even in the edge of great motion.

SUMMARY OF THE INVENTION

The present invention has been made to overcome the above-mentioned and/or other problems of the related art. Accordingly, an aspect of the present invention is to provide an apparatus and a method of deinterlacing capable of improving the quality of a picture by performing appropriate interpolation in accordance with a degree of motion and a direction of an edge when the picture is in motion.

Additional aspects and advantages of the invention will be set forth in part in the description which follows and, in part, will be obvious from the description, or may be learned by practice of the invention.

The above and/or other aspects the present invention are realized by providing a deinterlacing apparatus comprising a mixing weight calculation unit to calculate a weight for mixing after detecting a degree of a motion between a previous field and a next field relative to a pixel to be interpolated into the current field, wherein the previous field, the current field and the next field of an image signal are input temporally consecutively; an intra-field interpolation unit to detect a directional data based on values of pixels adjacent to the pixel to be interpolated into the current field, and to calculate an interpolation value by using the values of the adjacent pixels in accordance with the directional data; an inter-field interpolation unit to calculate an interpolation value obtained by averaging values of pixels of the previous field and the next field corresponding to the pixel to be interpolated into the current field, and a soft switching unit to mix an output value of the intra-field interpolation unit and that of the inter-field interpolation unit by using the weight for mixing and to output the mixed value.

The mixing weight calculation unit may comprise: a motion detection unit to calculate a motion information value showing a degree of a motion between the previous field and the next field relative to the pixel to be interpolated into the current field; a space filtering unit to remove a noise included in the motion information value and to output a filtered motion information value, a motion expansion unit to expand the filtered motion information value to include information about pixels adjacent of the pixel to be interpolated of the current field and to output the expanded motion information value, and an alpha conversion function unit to calculate the weight for mixing based on the expanded motion information value. The motion detection unit may calculate the motion information value by using a predetermined function that is inversely proportional to an input of an edge value in a vertical direction of the pixel to be interpolated.

The intra-field interpolation unit may comprise: a horizontal high frequency element detection unit to calculate a horizontal high frequency element value around the pixel to be interpolated into the current field; a vertical low frequency pass filtering unit to perform low frequency filtering of the calculated horizontal high frequency element value, a directional element detection unit to calculate a directional data based on values of the pixels adjacent to the pixel to be interpolated into the current field, a global/local minimum directional value calculation unit to calculate a global minimum directional value and a local minimum directional value based on the calculated directional data; a reliability detection unit to calculate a final interpolation direction based on the global minimum directional value and the local minimum directional value; and a final interpolation unit to calculate a final interpolation value in one direction among a global direction, a local direction and a vertical direction based on the final interpolation direction. The horizontal high frequency element detection unit may calculate the horizontal high frequency element value by using a sum of gradients of pixels adjacent to the pixel of the current field to be interpolated.

The final interpolation unit may perform interpolation in the vertical direction when the horizontal high frequency element value is greater than a predetermined first threshold, and operates interpolation in accordance with the final direction calculated at the reliability detection unit when the horizontal high frequency element value is smaller than the predetermined first threshold. The interpolation may be performed after detecting whether a pixel value interpolated in the global direction corresponds to a medium value of two pixels up and down in a local direction when the final interpolation unit performs the interpolation in the global direction.

In another aspect of the present invention, a method of deinterlacing comprises calculating a weight for mixing after detecting a degree of a motion between a previous field and a next field on the basis of a pixel of a current field to be interpolated, wherein the previous field, the current field and the next field of an image signal are input temporally consecutively detecting a directional data being included in values of pixels adjacent to the pixel to be interpolated into the current field, and calculating a first interpolation value by using values of pixels adjacent to the pixel of the current field to be interpolated in accordance with the directional data calculating a second interpolation value obtained by averaging the values of the pixels in the previous and the next fields corresponding to the pixel to be interpolated into the current field, and mixing the first and second interpolated values calculated by using the weight for mixing, and outputting the mixed value.

The calculating of the weight for mixing may comprise calculating a motion information value showing a degree of a motion between the previous field and the next field relative to the pixel to be interpolated into the current field, removing a noise included in the calculated motion information value and outputting a reduced noise motion information value, expanding the reduced noise motion information value to include pixels adjacent to the pixel to be interpolated of the current field and outputting the expanded motion information value, and calculating the weight for mixing based on the expanded motion information value.

The calculating of the motion information value may comprise using a predetermined function that is inversely proportional to an edge value in a vertical direction of the pixel to be interpolated.

The detecting of the directional data may comprise calculating a horizontal high frequency element value around the pixel of the current field to be interpolated, performing low frequency filtering of the high frequency element value, calculating a directional data based on values of pixels adjacent to the pixels of the current field to be interpolated, calculating a global minimum directional value and a local minimum directional value based on the calculated directional data, calculating a final interpolation direction based on the global minimum directional value and the local minimum directional value, and calculating a final interpolation value in one direction among a global direction, a local direction and a vertical direction based on the final interpolation direction.

The calculating of the horizontal directional high frequency element value may comprise using a sum of gradients of the pixels adjacent to the pixel of the current field to be interpolated.

The calculating of the final interpolation value may be performed based on the vertical direction when the horizontal high frequency element value is greater than a predetermined first threshold. Alternatively, the final interpolation value may be performed based on the calculated final interpolation direction when the horizontal high frequency element value is smaller than the predetermined first threshold.

The calculating of the final interpolation value may be performed after detecting whether a pixel value interpolated in the global direction corresponds to a median value of two pixels up and down in a local direction when the interpolation is performed in the global direction.

BRIEF DESCRIPTION OF THE DRAWINGS

The above and/or other aspects and advantages of the present invention will be more apparent and more readily appreciated from the following description of the preferred embodiments of the present invention, taken in conjunction with the accompanying drawings of which:

FIG. 2 is a flow chart showing a method of deinterlacing using the apparatus shown in FIG. 1;

DESCRIPTION OF THE PREFERRED EMBODIMENT

Figure 1:
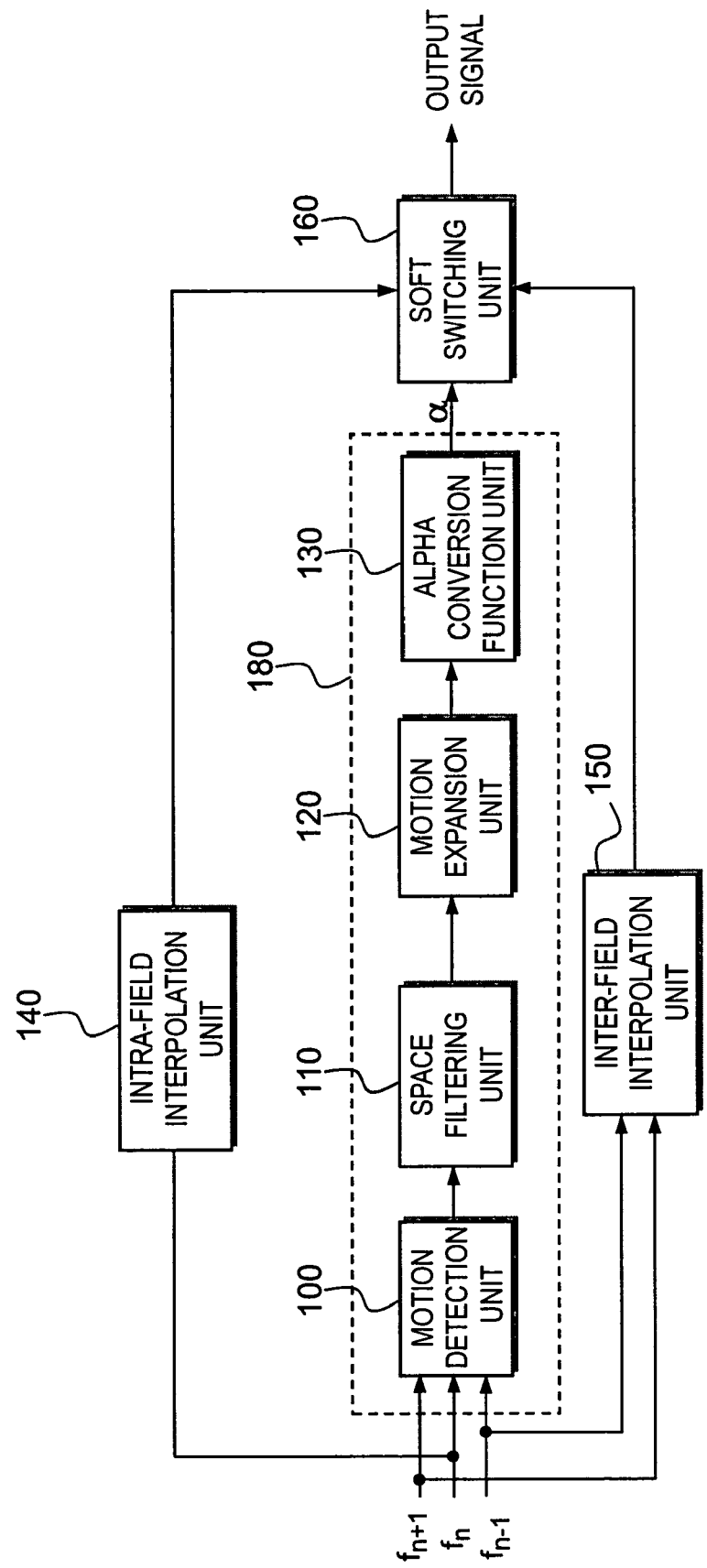
FIG. 1 is a block diagram showing a deinterlacing apparatus according to the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 is a block diagram showing a deinterlacing apparatus of the present invention. The deinterlacing apparatus is comprised of a motion detection unit 100, a space filtering unit 110, a motion expansion unit 120, an alpha conversion function unit 130, an intra-field interpolation unit 140, an inter-field interpolation unit 150, and a soft switching unit 160. The motion detection unit 100, the space filtering unit 110, the motion expansion unit 120, and the alpha conversion function unit 130 collectively form a mixing weight calculation unit 180.

Referring to FIG. 1, the motion detection unit 100 detects a motion information value with respect to a to-be-interpolated pixel of a current field. The space filtering unit 110 removes or reduces a noise level included in the motion information value detected by the motion detection unit 100. The motion expansion unit 120 receives an output value of the space filtering unit 110 and expands a motion degree value to other pixels adjacent to the pixel to be interpolated. The alpha conversion function unit 130 calculates α, a weight for mixing the motion information value expanded by the motion expansion unit 120.

The intra-field interpolation unit 140 outputs an interpolation value in accordance with a certain direction by using a gradient after inputting pixel values around the pixels of a current field to be interpolated. The inter-field interpolation unit 150 outputs an interpolation value that is obtained by averaging pixel values of a previous field and a next field corresponding to the pixel to be currently interpolated. The soft switching unit 160 outputs an interpolation value after mixing the interpolation value of the intra-field interpolation unit 140 and the inter-field interpolation unit 150 by using the weight (α).

FIG. 2 is a flow chart for explaining an operation of the deinterlacing apparatus of FIG. 1. Referring to the flow chart of FIG. 2, the motion detection unit 100 detects a degree of motion between temporally consecutive fields on a basis of a pixel of a current field to be interpolated, and calculates a motion information value by using the detected degree of motion and a vertical edge value (S200).

In a case of general motion detection, motion information is detected through a difference between same sampling grid fields. In some instances, a spurious still pixel in the case of an image having relatively fast motion with less relation between the current field and a previous field or a next field may be created. To prevent the spurious still pixel from being created, a relation between a current field and fields of previous and next is directly used as the motion information. Thus, the spurious still pixel is removed from the detected motion information and relatively fast motion generated between adjacent fields is effectively detected.

Figure 3A:
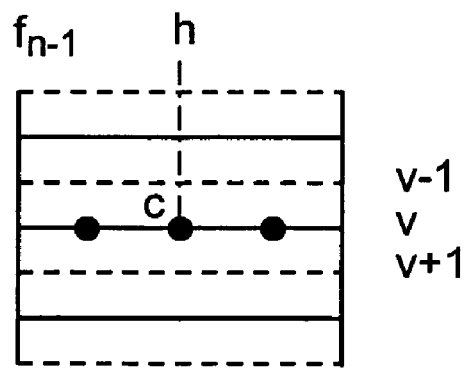
FIGS. 3A, 3B and 3C are views showing a process of motion detection.
Figure 3B:
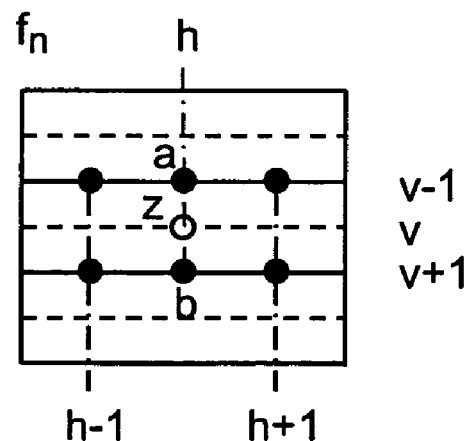

FIGS. 3A–3B are views showing a pixel to be used for motion detecting by the motion detection unit 100. In FIG. 3A, $f_{n-1}$ is an n−1th field, in FIG. 3B, $f_n$ is an nth current field, and in FIG. 3C, $f_{+1}$ is an n+1th field. In addition, v is a vertical direction and h is a horizontal direction. Assuming that a field to be currently interpolated is a current field, then $f_n$ is the current field, $f_{n+1}$ is a next field and $f_{n-1}$ is a previous field. In FIG. 3B, the circle z represents a pixel to be interpolated into the current field.

Figure 3C:
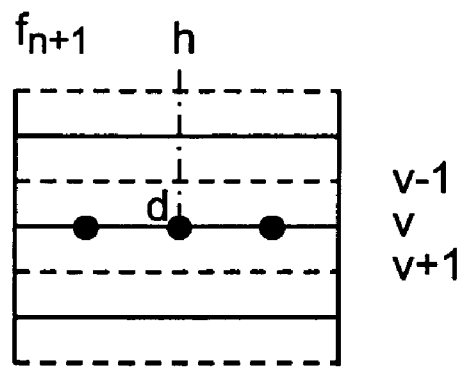

In FIGS. 3A–3C, solid lines represent lines of pixels which would normally be displayed on a screen in an interlaced mode. Each area shown in FIGS. 3A, 3B and 3C represents a same physical area of a screen and solid dots a, b, c and d represent pixels which would be displayed in the interlaced mode. In FIG. 3B pixels a and b are pixels which are defined by input signal data of the current field $f_n$ and the circle z represents a pixel which is not defined by input signal data of the current field, but which will be interpolated or synthesized based on the current field, previous field, and next field data and interpolated into the current field. The interpolated or synthesized pixel z is then combined with the input current field data to output interpolated current field data including the interpolated pixel z and displayed in a position relative to pixels a and b contemporaneously with the display of pixels a and b in a non-interlaced mode. A vertical position and a horizontal position of the pixel z to be interpolated into the current field for display in the non-interlaced mode are represented by v and h, respectively. The position (v, h) also corresponds to the position where pixels c and d would appear if pixels c and d were displayed in an interlaced mode.

The motion detection unit 100 firstly calculates regulated pixel difference minimum units $\Delta_c$, $\Delta_a$, and $\Delta_b$ to detect the motion with respect to the pixel to be interpolated (point z) as shown in FIG. 3B according to mathematical expressions 1a, 1b and 1c, respectively.

$$\begin{aligned}\Delta_c &= |f_{n-1}(v, h) - f_{n+1}(v, h)| & (1a) \\ \Delta_a &= |f_{n-1}(v, h) - (f_n(v-1, h) + f_n(v+1, h))/2| & (1b) \\ \Delta_b &= |f_{n+1}(v, h) - (f_n(v-1, h) + f_n(v+1, h))/2| & (1c)\end{aligned} \quad (1)$$

where, $f_{n-1}(v,h)$ is a pixel value at the position of (v, h) of an n−1th field, $f_{n-1}$, and $f_{n+1}$ (v,h) a pixel value at the position of (v, h) of an n+1th field, $f_{n+1}$. Additionally, $f_n(v-1,h)$ and $f_n(v+1,h)$ are pixel values at the position of (v−1,h) and (v+1,h) of an nth field, $f_n$ respectively.

Referring to the existence of a vertical edge at the pixel to be interpolated into the current field by using the mathematical expression 1, the spurious still pixel of the pixel unit that could be created in the case of an image having relatively fast motion with less relation among the current field, a previous field and a next field can be effectively removed.

The motion detection unit 100 calculates the motion information value by using a vertical edge value. The vertical edge value of the pixel to be currently interpolated can be obtained by using 3×3 mask shown in FIG. 4. The motion information value Δ of the pixel to be currently interpolated is calculated by mathematical expression 2.

$$\Delta = \max(\Delta_c, \delta \max(\Delta_a, \Delta_b)) \quad (2)$$

here, δ is calculated by a certain function that is inversely proportional to an input, which is the vertical edge value. For example, δ may be obtained by using a linear function and inputting the vertical edge value.

```
IF (vertical_edge > T2) THEN
   δ = 0
ELSE IF (vertical_edge < T1) THEN
   δ = 1
ELSE THEN
   δ = (T2 − vertical_edge)/(T2 − T1)
END IF
```

Figures 4, 5:
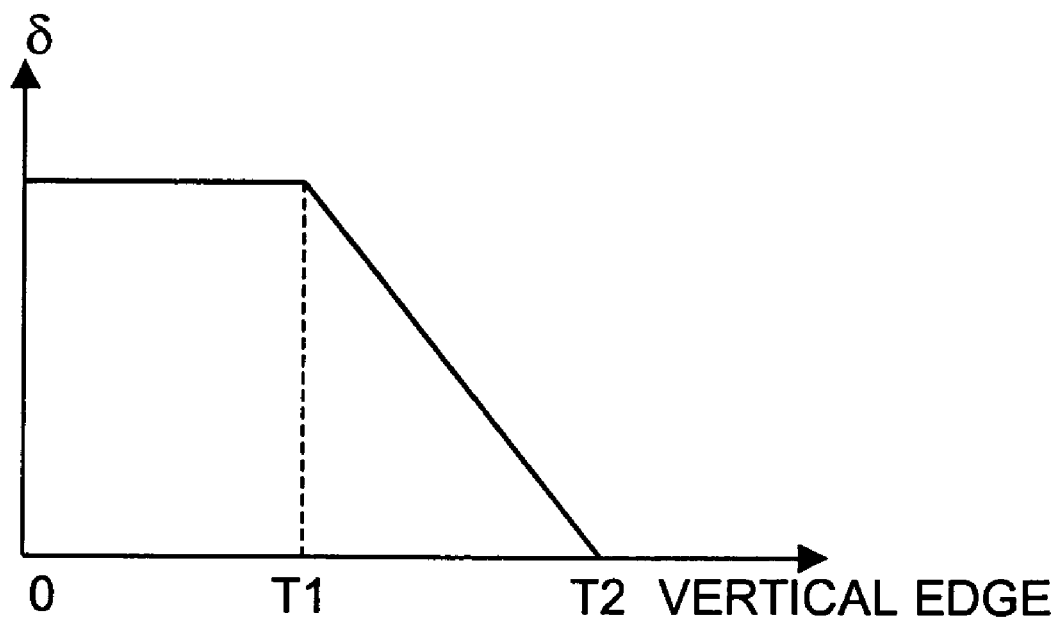
FIG. 4 is a view showing an example of a 3×3 mask that is useable to obtain an edge value in a vertical direction.
FIG. 5 is a graph of calculating δ.

In the calculating of δ, vertical_edge is the vertical edge value, and when the value δ is expressed as a graph, the graph is as shown in FIG. 5.

As described above, obtaining the motion information value by simply using max($\Delta_a, \Delta_b$) is effective when detecting the motion with respect to the current, previous and next fields. Yet, the reason to apply calculation of the motion information value by using the vertical edge value in accordance with the mathematical expressions 1 and 2 is that a spurious motion area may be expanded in the case of a still image having the vertical directional edge. Therefore, the spurious motion pixel may be prevented from being expanded as the motion information values of the current, previous and next fields are variably used by applying the vertical edge value at the pixel to be currently interpolated.

When the motion information value is detected at the motion detection unit 100, the space filtering unit 110 removes or reduces the noise level included in the calculated motion information value (S202). The spurious still pixel that could be generated in the unit of a pixel in the case of an image having degraded temporal relation becomes more preventable as the noise level is removed or reduced.

The motion expansion unit 120 receives the output value of the space filtering unit 100 and expands the motion degree value to the other pixels adjacent to the pixel to be interpolated (S204). The reason why the motion expansion unit 120 expands the motion degree value to the adjacent pixels is that motion is generally noticed as motion of a pixel group in a certain area and not as motion of a specific certain pixel. Thus, when the motion is detected at a certain pixel, it may be regarded that the certain pixel has noise, or that the certain pixel and adjacent pixels are in motion. However, the noise level is already removed at the space filtering unit 110, thus there is a high probability that the adjacent pixels are actually in motion and not merely indicated as being in motion by the noise of the pixel. Therefore, the motion expansion unit 120 expands the motion degree value output from the space filtering unit 100 to the other pixels adjacent to a pixel of which motion degree value is detected.

The alpha conversion function unit 130 calculates an alpha value ($\alpha$), that is a weight ($\alpha$) for mixing based on the motion information value expanded by the motion expansion unit 120 (S206). A plurality of weights ($\alpha$) respectively corresponding to each of a plurality of motion information values is stored into a table, and one of the weights ($\alpha$) stored in the table is selected based on the motion information value output from the motion expansion unit 120. The weight ($\alpha$) has a value in a range between 0 and 1.

The intra-field interpolation unit 140 outputs an interpolation value in accordance with a direction by using a gradient around of a pixel, as an adjacent pixel value in the field to be interpolated is input. A detailed description on the intra-field interpolation unit 140 is set forth below.

The inter-field interpolation unit 150 outputs a value after averaging the pixel values of a pixel in a previous field and a pixel in a next field which are in a same position relative to the field as the pixel to be interpolated (e.g., pixels c and d as shown in FIGS. 3A and 3C) as shown in mathematical expression 3.

$$f_t(v,h)=(f_{n-1}(v,h)+f_{n+1}(v,h))/2 \quad (3)$$

The soft switch unit 160 mixes the output values of the intra-field interpolation unit 140 and the inter-field interpolation unit 150 using the alpha value ($\alpha$) that is the weight calculated at the alpha conversion function unit 130 and outputs a mixed value (S208). In other words, assuming that the pixel value calculated at the intra-field interpolation unit 140 is $f_s(v,h)$ and the pixel value calculated at the inter-field interpolation unit 150 is $f_t(v,h)$, then a signal finally output through the soft switching unit 160 may be calculated as shown in mathematical expression 4.

$$f_s(v,h)=\alpha f_s(v,h)+(1-\alpha)f_t(v,h) \quad (4)$$

The soft switching unit 160 outputs interpolation values in accordance with the degree of motion by variably mixing the interpolation values of the inter-field interpolation unit 140 and the intra-field interpolation field 150.

The operation of the intra-field interpolation unit 140 in the above-described deinterlacing apparatus is described in more detail below.

Figure 6:
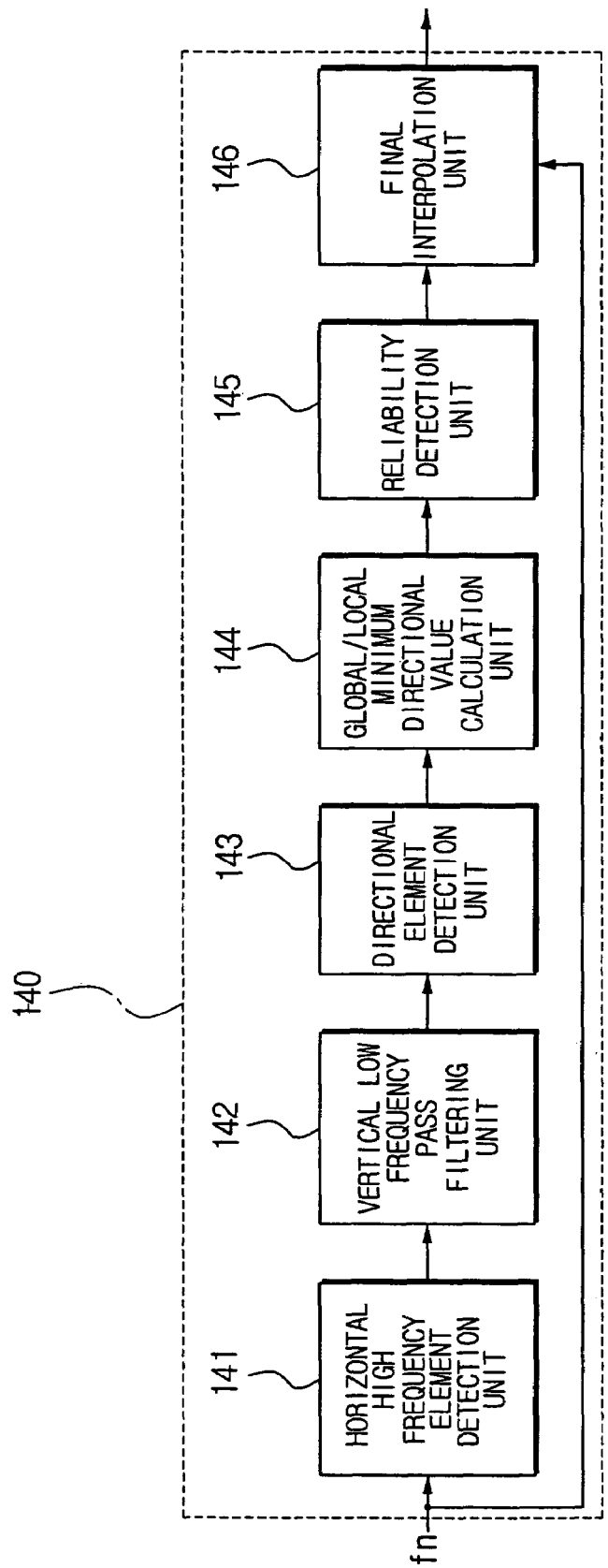
FIG. 6 is a block diagram showing an interpolation unit of an intra-field.

FIG. 6 is a block diagram of the intra-field interpolation unit 140. The intra-field interpolation unit 140 comprises a horizontal high frequency element detection unit 141, a vertical low frequency pass filtering unit 142, a directional element detection unit 143, a global/local minimum directional value calculation unit 144, a reliability detection unit 145, and a final interpolation unit 146.

The horizontal high frequency element detection unit 141 detects a horizontal high frequency element around the pixel to be interpolated. The vertical low frequency pass filtering unit 142 performs low frequency pass filtering in a vertical direction at the current field. The directional element detection unit 143 detects directional data in the direction of each pixel. The global/local minimum directional value calculation unit 144 detects a global minimum direction and a local minimum direction by using the directional data. The reliability detection unit 145 detects the reliability of a global direction. Additionally, the final interpolation unit 146 calculates a final interpolation value.

Figure 7:
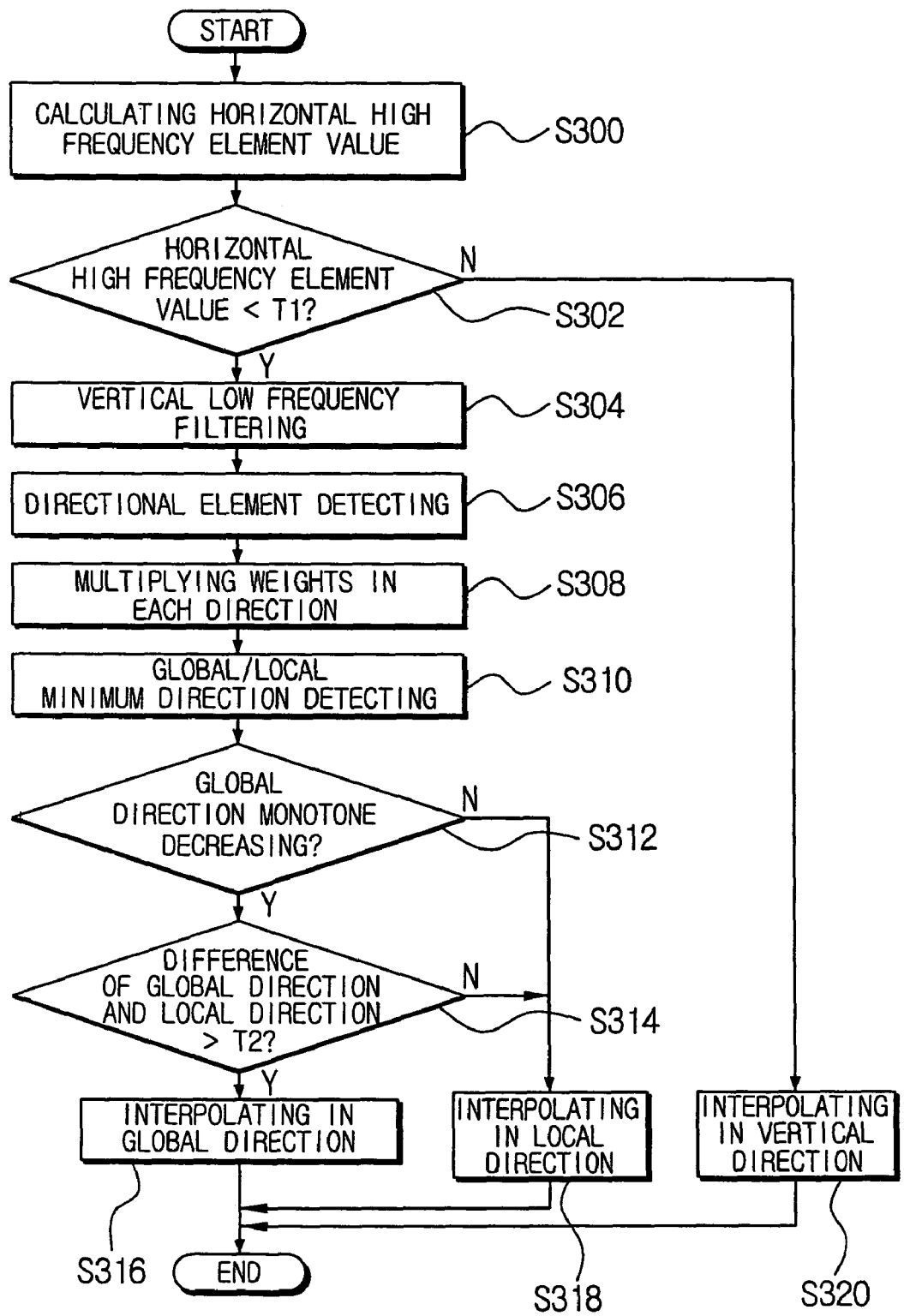
FIG. 7 is a flow chart showing the operation of the interpolation unit of the intra-field of FIG. 6.

FIG. 7 is a flow chart for explaining the operation of the intra-field interpolation unit 140. Referring to FIG. 7, the horizontal high frequency element detection unit 141 detects a horizontal high frequency element value (H-HPF) around the pixel to be currently interpolated (S300). The horizontal high frequency element value (H-HPF) is obtained from the sum of the gradient of pixels around the pixel to be interpolated according to mathematical expression 5.

$$H-HPF = |f_n(v-1,h-1) - f_n(v-1,h)| + \\ |f_n(v-1,h+1) - f_n(v-1,h)| + |f_n(v+1,h-1) - \\ f_n(v+1,h)| + |f_n(v+1,h+1) - f_n(v+1,h)| \quad (5)$$

The horizontal high frequency element value (H-HPF) calculated by the above expression is compared with a predetermined threshold (T1) (S302). When the H-HPF value is greater than the threshold (T1), interpolation in the vertical direction is performed (S 320). When the horizontal high frequency element value (H-HPF) is less than the threshold (T1), the vertical low frequency pass filtering unit 142 performs low frequency pass filtering in a vertical direction (S304). The low frequency pass filtering in a vertical direction is performed in order to remove noise generated in the vertical direction.

The directional element detection unit 143 detects directional data in the direction of each pixel of x=−1, 0, 1, . . . , n (S306). The directional data is calculated by mathematical expression 6.

$$D(x) = \sum_{i=-2}^{2} \{\text{coeff}[i] \cdot |\hat{f}_n(v-1, h-x+i) - f_n(v+1, h+x+i)|\} \quad (6)$$

where, coeff is a predetermined constant value having a weight in the center of i=−2, −1, 0, 1, 2, and $\bar{f}_n$ (v, h) is a pixel value that is low frequency filtered in the vertical direction.

Figure 8A:
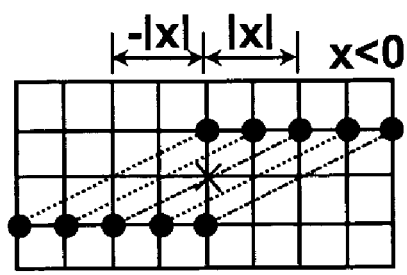
FIGS. 8A, 8B and 8C are views showing a process of calculating a directional value.
Figure 8B:
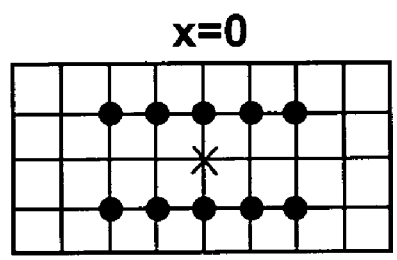
Figure 8C:
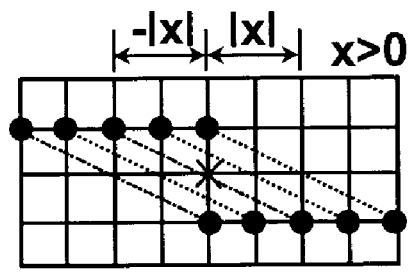

FIGS. 8A–8C are views showing pixels used to detect the directional data in the pixel direction of x=−n, . . . , −1, 0, 1, . . . , n. As shown in FIGS. 8A–8C, the directional data may be calculated by changing the values of x.

The directional element detection unit 143 multiplies the directional data D(x) calculated in each direction and the weight that is constant in each direction and outputs the multiplied value (S308).

The global/local minimum directional value calculation unit 144 detects the global minimum directional data and the local minimum directional data by using the directional data obtained by multiplying the predetermined weight calculated at the directional element detection unit 143 (S310). Here, the global minimum directional data is a minimum directional value calculated at an entire area (for example, pixel direction of x=−n, . . . , −1, 0, 1, . . . , n) and the local minimum directional data is a minimum directional value calculated at a direction of a low degree (for example, pixel direction of x=−1, 0, 1).

The reliability detection unit 145 detects a reliability of the global minimum directional data calculated at the global/local minimum directional value calculation unit 144. In other words, the reliability detection unit 145 detects whether the directional data, which is calculated as the global minimum directional data from an adjacent low direction, monotone decreases (S312). When the directional data does not monotone decrease, the interpolation is operated with respect to the local direction (S318). More over, when the gradient of the global minimum directional data and the local minimum directional data is less than a second threshold (T2), the interpolation is operated with respect to the local direction (S318), otherwise, the interpolation is operated with respect to the global direction (S316).

The final interpolation unit 146 performs the interpolation with respect to one direction among the global, local and vertical directions decided at the previous process (S316, S318 and S320).

When the final interpolation unit 146 performs the interpolation with respect to the global direction, the pixel value $f_g(v,h)$ interpolated with respect to the global direction is calculated by mathematical expression 7.

$$f_g(v,h)=(f_n(v-1,h\text{-global-direction})+f_n(v+1,h\text{+global-direction}))/2f_m(v,h) \quad (7)$$

The calculated pixel value $f_g(v,h)$ is output after detecting whether the pixel value interpolated in the global direction fits a medium value of two pixels of up and down in the local direction by using a 3 tap median filter in order to compensate an error. To do so, the pixel values of up and down, $f_{1-dn}(v,h)$ and $f_{1-up}(v,h)$ in the local direction are calculated by mathematical expression 8.

$$f_{1-up}(v,h)=f_n(v-1,h\text{-global-direction})$$

$$f_{1-dn}(v,h)=f_n(v+1,h\text{+global-direction}) \quad (8)$$

Therefore, a final interpolation value to be interpolated through the median filter is calculated by mathematical expression 9.

$$f_m(v,h)=\text{Median}(f_g(v,h),f_{1-up}(v,h),f_{1-dn}(v,h)) \quad (9)$$

In mathematical expression 9, the median is an operator taking a medium value after re-arraying given data according to their magnitude. In other words, only the pixel value interpolated in the global direction is the medium value of an upper and a lower pixel is used as the final interpolation value.

When the final interpolation unit 146 performs the interpolation in the local direction, the final interpolation value is calculated by mathematical expression 10.

$$f_l(v,h)=(f_n(v-1,h\text{-local-direction})+f_n(v+1,h\text{+local-direction}))/2 \quad (10)$$

When the final interpolation unit 146 performs the interpolation in the vertical direction, as a horizontal high frequency element value is greater than the first threshold (T1), the final interpolation value is calculated by mathematical expression 11.

$$f_v(v,h)=(f_n(v-1,h)+f_n(v+1,h))/2 \quad (11)$$

As described above, the intra-field interpolation unit 140 outputs an interpolation value among $f_m(v,h)$, $f_l(v,h)$, $f_v(v,h)$ calculated by the mathematical expressions 9, 10 and 11. The output value of the intra-field interpolation unit 140 is transferred to the soft switching unit 160 as described in the above. After that, the output value is mixed with the interpolation value of the inter-field interpolation unit 150 and a finally deinterlaced signal is output as in the mathematical expression 4.

According to the present invention, the quality of a deinterlaced image is upgraded, as the motion detection value using a vertical edge value is applied and detection of directional data and interpolation in relation to the detection is operated.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A deinterlacing apparatus comprising:
   a mixing weight calculation unit to calculate a weight for mixing after detecting a degree of a motion between a pixel of a previous field and a pixel of a next field, which pixels correspond to a pixel of a current field to be interpolated;
   an intra-field interpolation unit to detect directional data included in values of pixels of the current field adjacent to the pixel to be interpolated into the current field, and to calculate a first interpolation value by using the values of the adjacent pixels in accordance with the directional data;
   an inter-field interpolation unit to calculate a second interpolation value obtained by averaging the values of the pixel in the previous field and the pixel in the next field corresponding to the pixel to be interpolated into the current field; and
   a soft switching unit to mix the first and second interpolation values by using the weight and to output a mixed value,
   wherein the mixing weight calculation unit comprises:
      a motion detection unit to calculate a motion information value showing the degree of motion between the pixel of the previous field and the pixel of the next field based on the pixel to be interpolated into the current field,
      wherein the motion detection unit calculates the motion information value by using a predetermined function that is inversely proportional to an input of an edge value of a vertical direction.

2. The deinterlacing apparatus of claim 1, wherein the mixing weight calculation unit further comprises:
a space filtering unit to remove a noise included in the motion information value and to output the motion information value;
a motion expansion unit to expand the motion information value to the pixels adjacent to the pixel to be interpolated of the current field and output the value; and
an alpha conversion function unit to calculate the weight for mixing based on the expanded motion information value.

3. A deinterlacing apparatus comprising:
a mixing weight calculation unit to calculate a weight for mixing after detecting a degree of a motion between a pixel of a previous field and a pixel of a next field, which pixels correspond to a pixel of a current field to be interpolated;
an intra-field interpolation unit to detect directional data included in values of pixels of the current field adjacent to the pixel to be interpolated into the current field, and to calculate a first interpolation value by using the values of the adjacent pixels in accordance with the directional data;
an inter-field interpolation unit to calculate a second interpolation value obtained by averaging the values of the pixel in the previous field and the pixel in the next field corresponding to the pixel to be interpolated into the current field; and
a soft switching unit to mix the first and second interpolation values by using the weight and to output a mixed value,
wherein the intra-field interpolation unit comprises:
a horizontal high frequency element detection unit to calculate a horizontal high frequency element value around the pixel to be interpolated into the current field;
a vertical low frequency pass filtering unit to perform low frequency filtering based on the calculated horizontal high frequency element value;
a directional element detection unit to calculate directional data based on values of the pixels adjacent to the pixel to be interpolated into the current field;
a global/local minimum directional value calculation unit to calculate a global minimum directional value and a local minimum directional value based on the calculated directional data;
a reliability detection unit to calculate a final interpolation direction based on the global minimum directional value and the local minimum directional value; and
a final interpolation unit to calculate a final interpolation value in one direction among a global, a local and a vertical direction based on the final interpolation direction.

4. The deinterlacing apparatus of claim 3, wherein the horizontal high frequency element detection unit calculates the horizontal high frequency element value by using a sum of gradients of the pixels adjacent to the pixel of the current field to be interpolated.

5. The deinterlacing apparatus of claim 3, wherein the final interpolation unit performs interpolation in the vertical direction when the horizontal high frequency element value is greater than a predetermined first threshold, and performs interpolation in accordance with the final interpolation direction calculated by the reliability detection unit when the horizontal high frequency element value is smaller than the predetermined first threshold.

6. The deinterlacing apparatus of claim 5, wherein the interpolation is performed after detecting whether a pixel value interpolated in the global direction corresponds to a median value of two pixels up and down in a local direction when the final interpolation unit performs the interpolation in the global direction.

7. A deinterlacing method comprising:
calculating a weight for mixing after detecting a degree of a motion between a pixel of a previous field and a pixel of a next field based on a pixel of a current field to be interpolated the previous, the current and next fields referring to image signals input consecutively;
detecting directional data being included in values of pixels adjacent to the pixel to be interpolated into the current field, and calculating a first interpolation value by using the values of the adjacent pixels in accordance with the directional data;
calculating a second interpolation value by averaging the values of the pixel of previous field and the pixel of the next field corresponding to the pixel to be interpolated into the current field; and
mixing the first and second interpolated values by using the calculated weight for mixing, and outputting the mixed values,
wherein the calculating of the weight for mixing comprises:
calculating an initial motion information value showing a degree of a motion between the previous and the next field based on the pixel to be interpolated into the current field;
wherein, the initial motion information value is calculated by using a predetermined function that is inversely proportional to an input of an edge value of a vertical direction.

8. The deinterlacing method of claim 7, wherein the calculating of the weight for mixing further comprises:
removing a noise included in the initial motion information value and outputting a reduced noise motion information value;
expanding the reduced noise motion information value to the pixels adjacent to the pixel to be interpolated of the current field and outputting an expanded motion information value; and
calculating a weight to mix based on the expanded reduced motion information value.

9. A deinterlacing method comprising:
calculating a weight for mixing after detecting a degree of a motion between a pixel of a previous field and a pixel of a next field based on a pixel of a current field to be interpolated the previous, the current and next fields referring to image signals input consecutively;
detecting directional data being included in values of pixels adjacent to the pixel to be interpolated into the current field, and calculating a first interpolation value by using the values of the adjacent pixels in accordance with the directional data;
calculating a second interpolation value by averaging the values of the pixel of previous field and the pixel of the next field corresponding to the pixel to be interpolated into the current field; and
mixing the first and second interpolated values by using the calculated weight for mixing, and outputting the mixed value,
wherein the detecting of the directional data comprises:
calculating a horizontal high frequency element value around the pixel to be interpolated into the current field;

performing low frequency filtering on the calculated horizontal high frequency element value;

calculating directional data based on values of pixels adjacent to the pixel to be interpolated into the current field;

calculating a global minimum directional value and a local minimum directional value based on the calculated directional data;

calculating a final interpolation direction based on the global minimum directional value and the local minimum directional value; and calculating a final interpolation value in one direction among a global, a local and a vertical direction based on the final interpolation direction.

10. The deinterlacing method of claim 9, wherein the horizontal high frequency element value is calculated by using a sum of gradients of the pixels adjacent to the pixel of the current field to be interpolated.

11. The deinterlacing method of claim 9, wherein:

the calculating of the final interpolation value is performed in the vertical direction when the horizontal directional high frequency element value is greater than a predetermined first threshold, and the calculating of the final interpolation value is performed in accordance with the final interpolation direction calculated when the horizontal high frequency element value is smaller than the predetermined first threshold.

12. The deinterlacing method of claim 11, wherein:

the interpolation is performed after detecting whether a pixel value interpolated in the global direction corresponds a median value of two pixels up and down in a local direction when the interpolation is performed in the global direction.

* * * * *

UNITED STATES PATENT AND TRADEMARK OFFICE
CERTIFICATE OF CORRECTION

PATENT NO. : 7,142,247 B2 Page 1 of 1
APPLICATION NO. : 10/626883
DATED : November 28, 2006
INVENTOR(S) : You-young Jung It is certified that error appears in the above-identified patent and that said Letters Patent is hereby corrected as shown below:

Title Page, Item 57 Column 2 (Abstract), Line 10, delete "on the" before "inter-field".

Column 12, Line 24, change "values," to --value,--.

Signed and Sealed this

Twentieth Day of March, 2007

JON W. DUDAS
*Director of the United States Patent and Trademark Office*